(12) United States Patent
Brockhaus

(10) Patent No.: US 6,799,476 B2
(45) Date of Patent: Oct. 5, 2004

(54) MASS FLOWMETER AND METHOD FOR OPERATING A MASS FLOWMETER

(75) Inventor: Helmut Brockhaus, Dinslaken (DE)

(73) Assignee: Krohne A.G., Basel (CH)

(*) Notice: Subject to any disclaimer, the term of this patent is extended or adjusted under 35 U.S.C. 154(b) by 45 days.

(21) Appl. No.: 10/313,832

(22) Filed: Dec. 6, 2002

(65) Prior Publication Data
US 2003/0126932 A1 Jul. 10, 2003

(51) Int. Cl.⁷ .................................................. G01F 1/78

(52) U.S. Cl. .............................................. 73/861.356

(58) Field of Search ..................... 73/861.355, 861.356, 73/861.357; 331/65; 713/300; 702/127

(56) References Cited

U.S. PATENT DOCUMENTS

| | | | | |
|---|---|---|---|---|
| 5,321,991 A | * | 6/1994 | Kalotay | 73/861.357 |
| 5,469,748 A | * | 11/1995 | Kalotay | 73/861.356 |
| 5,804,742 A | * | 9/1998 | Rademacher-Dubbick | 73/861.357 |
| 5,884,087 A | * | 3/1999 | White et al. | 713/310 |
| 5,926,096 A | * | 7/1999 | Mattar et al. | 340/606 |
| 6,476,522 B1 | | 11/2002 | Jukes et al. | |
| 6,505,518 B1 | | 1/2003 | Hays et al. | |
| 2001/0045134 A1 | | 11/2001 | Henry et al. | |

* cited by examiner

Primary Examiner—Edward Lefkowitz
Assistant Examiner—Jewel V. Thompson
(74) Attorney, Agent, or Firm—Cesari and McKenna LLP

(57) ABSTRACT

A mass flowmeter and a method for operating a mass flowmeter is based on the Coriolis principle and incorporates a Coriolis measuring tube, an oscillator associated with and stimulating said Coriolis measuring tube, and a transducer associated with the Coriolis measuring tube and which collects Coriolis forces and/or oscillations based on Coriolis forces. The electric power consumed in the mass flowmeter is controlled as a function of the available electric power. This permits the efficient use of the available electric power, thus permitting the operation of the mass flowmeter via a two wire interface that serves for both the input of electric power and the output of measuring data.

19 Claims, 3 Drawing Sheets

MASS FLOWMETER AND METHOD FOR OPERATING A MASS FLOWMETER

BACKGROUND OF THE INVENTION

1. Field of the Invention

This invention relates to a method for operating a mass flowmeter that employs the Coriolis principle and is equipped with a Coriolis-type measuring tube, an oscillator associated with and stimulating said Coriolis measuring tube, and a transducer dedicated to said Coriolis measuring tube for collecting the Coriolis forces and/or oscillations derived from Coriolis forces. The invention further relates to a mass flowmeter that operates by the Coriolis principle and incorporates a Coriolis measuring tube, an oscillator stimulating the Coriolis measuring tube, and a transducer dedicated to said Coriolis measuring tube for collecting Coriolis forces and/or oscillations derived from Coriolis forces.

2. Description of the Prior Art

Prior-art Coriolis-type mass flowmeters usually feature separate ports respectively for power input, i.e. for the supply of electric power, and for the output of the measuring signal, i.e. for data transfer. Such separation of power input and data output makes the power supply virtually independent of the type of data transfer, meaning that in any event the power input is not restricted in a way that would limit the amount of power that can be fed into the mass flowmeter. It follows that a power supply unit can be selected which will ensure adequate power for the mass flowmeter and any under all operating conditions. This prevents interruptions in the operation of the mass flowmeter in situations where the power consumption of its components would otherwise exceed the available amount of electric power.

On the other hand, it would be desirable to operate the mass flowmeter of the type described above via a two wire input/output interface, meaning a port that can feed the necessary electric power to the mass flowmeter and at the same time output the measuring data. Such a two wire interface typically serves for the connection of a two wire process control loop for both signal transmission and supply of electric power, typically limited by a 4–20 mA current at a 24 V DC voltage. The operation of the mass flowmeter via a two wire port may be desirable, for instance, for explosion-protection considerations, given that a two wire port permits intrinsically safe operation of the mass flowmeter in that the maximum power available to the mass flowmeter is limited to a point where no spark with an ignition potential could be generated.

When a two wire port of the above type is used, the measuring signal is usually output with a current value of between 4 mA and 20 mA, so that in any case a current maximum of 4 mA is available for powering the components of the mass flowmeter. Any current in excess of that value is usually of no consequence given the fact that the amount of power for operating the components of the mass flowmeter must be predefined and preset. As a result, the effective power available for operating a Coriolis-type mass flowmeter with a two wire port for electric power input and measuring signal output is severely limited to a point where its practical use is difficult at best.

SUMMARY OF THE INVENTION

It is therefore the objective of this invention to introduce a method for operating a mass flowmeter that employs the Coriolis principle, and a mass flowmeter based on the Coriolis principle, that permits operation even with a limited maximum of available electric power and subject to time variations.

Referring to the aforementioned method for operating a mass flowmeter, that objective is achieved by this invention whereby the electric power consumed within the mass flowmeter is controlled as a function of the electric power actually available.

The method according to the invention thus prevents the electric power consumption by the components of the mass flowmeter from exceeding the available electric power, which does not necessarily have to involve an adjustment to the worst-case situation in which only the smallest amount of power is available. Instead, the control according to this invention of the electric power taken up and consumed within the mass flowmeter allows at any time the use of virtually all of the current as a function of the electric power available.

In this context it should be pointed out that, of course, the method according to the invention is not based on the simplistic realization that less available electric power necessarily leads to less power consumption. Rather, the method of this invention provides for the active control of the power consumption by the components of the mass flowmeter.

According to a preferred embodiment of the invention, such specific control of the power consumed in the mass flowmeter is provided by controlling the mean value of the oscillatory energy of the Coriolis measuring tube in adaptation to the electric power available. In a preferred implementation of the invention, this is accomplished by energizing the oscillator within the limits of the available electric power, preferably by controlling its amplitude. The desired adaptation to the available electric power can be achieved in that, whenever less electric power is available, the oscillator is activated with a lower amplitude. In other words, less available electric power will reduce the oscillation amplitude and thus the oscillating energy of the Coriolis measuring tube. If and when the available electric power rises again, the oscillating amplitude of the Coriolis measuring tube can rise as well. The fact that, within the constraints of harmonic oscillations, a higher oscillating amplitude of the Coriolis measuring tube is preferred over a lower amplitude is obviously attributable to the better signal-to-noise ratio obtainable with higher oscillating amplitudes in the Coriolis measuring tube.

Yet the mean-value oscillatory energy of the Coriolis measuring tube can be varied in other ways as well. For example, another preferred implementation of the invention, employed as an alternative or in addition to the above method, provides for the oscillator to be activated at time intervals as a function of the available electric power. Energizing the oscillator with interstitial time gaps means that, in contrast to conventional operation, the activation of the oscillator no longer takes place at the excitation frequency which usually corresponds to the resonance frequency of the Coriolis measuring tube within the excitation oscillation. Instead, in this preferred implementation of the invention, the oscillator, while still stimulated in a manner whereby the oscillation of the Coriolis measuring tube remains unchanged in terms of the aforementioned excitation oscillation, there is no activation of the oscillator during predefined oscillation cycles. For example, the oscillator may only be energized at certain time intervals, i.e. it is activated at the excitation frequency within a predefined periods while merely co-resonating with the Coriolis measuring tube during the passive intervals that follow.

For measuring operations it is important, however, that the oscillation of the Coriolis measuring tube is not stopped, meaning that the passive intervals in which no excitation takes place are preferably short enough to prevent the ever-present attenuation from causing a complete decay of the oscillation of the Coriolis measuring tube. As an alternative to the excitation of the Coriolis measuring tube at time intervals, one could conceivably stimulate the Coriolis measuring tube via the oscillator only during every nth cycle of the excitation oscillation, where n is an integer.

As an alternative or in addition to controlling the electric energy taken up and consumed in the mass flowmeter by means of the oscillatory energy of the Coriolis measuring tube, it is entirely possible within the scope of this invention to control all separate power-consuming components of the mass flowmeter. For example, a preferred implementation of the invention provides for an analog-to-digital converter (A/D converter) to accomplish the conversion of the measuring signal emanating from the transducer by controlling the sampling frequency as a function of the available electric power. Using a lower sampling frequency reduces the electric power consumption of the A/D converter.

In a preferred embodiment of the invention, the electric power consumed in the mass flowmeter is controlled by a power control unit which power control unit transitions into an energy-saving sleep mode in the event of a shortfall of a predefined available electric power level. In this fashion the electric power taken up in the mass flowmeter can be reduced even for the very component which, according to the invention, controls the electric power consumed in the mass flowmeter.

As stated further above, the method according to this invention permits optimal utilization of the available electric power. Accordingly, a preferred embodiment of the invention provides for the electric power input and the measuring signal output to take place via a two wire port. It is particularly desirable for the measuring output signal to be in the form of a current signal of between 4 mA and 20 mA. It is also possible to use for the power supply input and the measuring data output a bus-type interface, for instance a Foundation field bus or a Profibus according to IEC 31 G/89/NP or IEC 61158-2.

If the measuring data output is to take place via a two wire port or bus-type interface, one two wire port or bus interface will suffice. It is also possible, however, to provide multiple two wire ports or bus interfaces, in which case potentially more over-all electric power is available for the mass flowmeter. The control, according to this invention, of the electric power consumed in the mass flowmeter will then be a function of the total electric power available via all two wire ports and bus-type interfaces.

The mass flowmeter by means of which the objectives specified above can be achieved is characterized, according to the invention, in that a power control unit is provided for controlling the electric power consumption in the mass flowmeter.

The mass flowmeter according to the invention is therefore designed in a way as to permit operation by the above-described method according to the invention. In a preferred embodiment of the invention, the method of the invention can be implemented in the mass flowmeter of the invention in that a drive system is provided for activating the oscillator, in which case the power control unit can control the power consumption of the oscillator by way of said drive system.

Alternatively or additionally, another preferred embodiment of the invention makes it possible to design an A/D converter, serving to convert the measuring signal emanating from the transducer, in a way as to be controllable by the power control unit in terms of its sampling frequency.

The method according to this invention is particularly useful in conjunction with the mass flowmeter of this invention if, for the electric power supply input and the measuring data output, in a preferred implementation of the invention at least one above-described two wire port or bus-type interface is provided.

BRIEF DESCRIPTION OF THE DRAWINGS

There are numerous ways in which the method according to this invention and the mass flowmeter of this invention can be configured and enhanced. In this connection, reference is made to the subclaims to the independent main patent claims and to the following detailed description of preferred implementation examples of the invention, with the aid of the attached drawings, in which:

DETAILED DESCRIPTION OF AN ILLUSTRATIVE EMBODIMENTS

Figure 1:
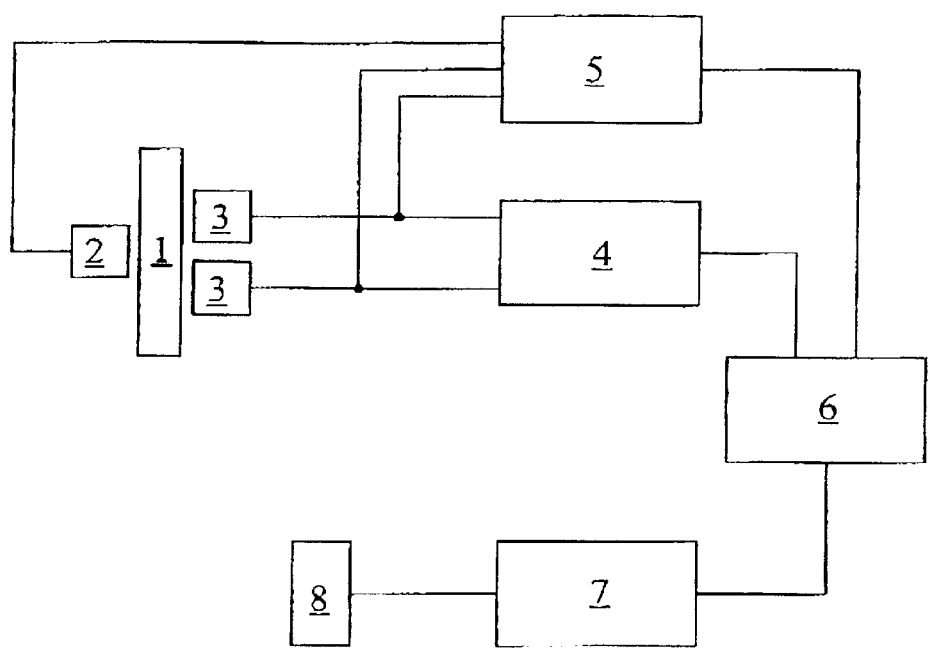
FIG. 1 is a schematic illustration of a mass flowmeter according to a first preferred embodiment of the invention.

As shown in FIG. 1, the mass flowmeter according to the first preferred embodiment of the invention includes a Coriolis measuring tube 1 with an associated oscillator 2 and two transducers 3 that serve to collect the oscillations of the Coriolis measuring tube 1. The transducers 3 connect to an A/D converter 4 that serves to digitize the analog measuring signals generated by the transducers 3. The oscillator 2 is activated via a drive system 5. The drive system 5 on its part connects to the transducers 3 so that, as is common in Coriolis-type mass flowmeters, the excitation oscillation can be tuned to the resonance frequency of the Coriolis measuring tube 1.

In the case of the mass flowmeter illustrated in FIG. 1 and reflecting the first preferred embodiment of the invention, it is important that a power control unit 6 be employed. For measuring the available electric power, the latter is connected to a power measuring device 7. The power measuring device 7 measures the electric current to determine how much electric power is available to the components of the mass flowmeter via the two wire interface 8 that is provided on the mass flowmeter and also doubles as the measuring data output port besides channeling electric power to the mass flowmeter. The available electric power value determined is fed by the power measuring device 7 to the power control unit 6 which, on its part, activates the A/D converter 4 and the drive system 5 within the constraints of the available electric power. The system is so designed that the average oscillatory energy of the Coriolis measuring tube is controlled as a function of the available electric power.

This is accomplished, inter alia, in that relative to its amplitude, the oscillator 2 is activated via the drive system 5 as a function of the available electric power. The desired adaptation to that available electric power takes place in such fashion that, when less electric power is available, the oscillator 2 is energized with an appropriately lower amplitude. In other words, less available electric power translates into a reduced oscillating amplitude and a correspondingly reduced oscillatory energy of the Coriolis measuring tube 1. As the available electric power increases again, the oscillating amplitude of the Coriolis measuring tube 1 will be augmented correspondingly via the drive system 5 and the oscillator 2.

However, the average oscillatory energy of the Coriolis measuring tube 1 can be varied in other ways as well. Specifically, as an additional provision, the oscillator 2 is activated in time intervals determined by the available electric power. As already stated further above, an activation of the oscillator 2 with interstitial time gaps means that, in contrast to conventional operation, such activation of the oscillator 2 no longer takes place at the excitation frequency which, in the case at hand, would be the resonance frequency of the Coriolis measuring tube 1 in the excitation oscillation. Instead, while the oscillator 2 continues to be stimulated in a manner whereby the oscillation of the Coriolis measuring tube 1 is maintained at the aforementioned excitation oscillation, there will be no activation of the oscillator 2 during predefined periods of that oscillation. In this particular case, this means that the oscillator 2 is only activated at certain time intervals, i.e. at the excitation frequency within predefined active intervals while merely co-resonating with the Coriolis measuring tube 1 during the subsequent passive intervals. To prevent a disruption of the oscillation of the Coriolis measuring tube 1, the passive intervals during which there is no excitation are kept short enough to avoid a complete decay of the oscillation of the Coriolis measuring tube 1 due to the ever-present attenuation factor.

In addition, the sampling frequency of the A/D converter 4 is controlled as a function of the available electric power. Using a lower sampling frequency reduces the electric power consumed by the A/D converter.

Finally, as an additional feature, the power control unit 6 is constituted of a microcontroller. This makes it possible for the power control unit 6 to enter into an energy-saving sleep mode whenever the available electric power drops below a predefined level. This reduces the electric power consumption in the mass flowmeter even for the component that manages the control of the electric power taken up in the mass flowmeter.

Figure 2:
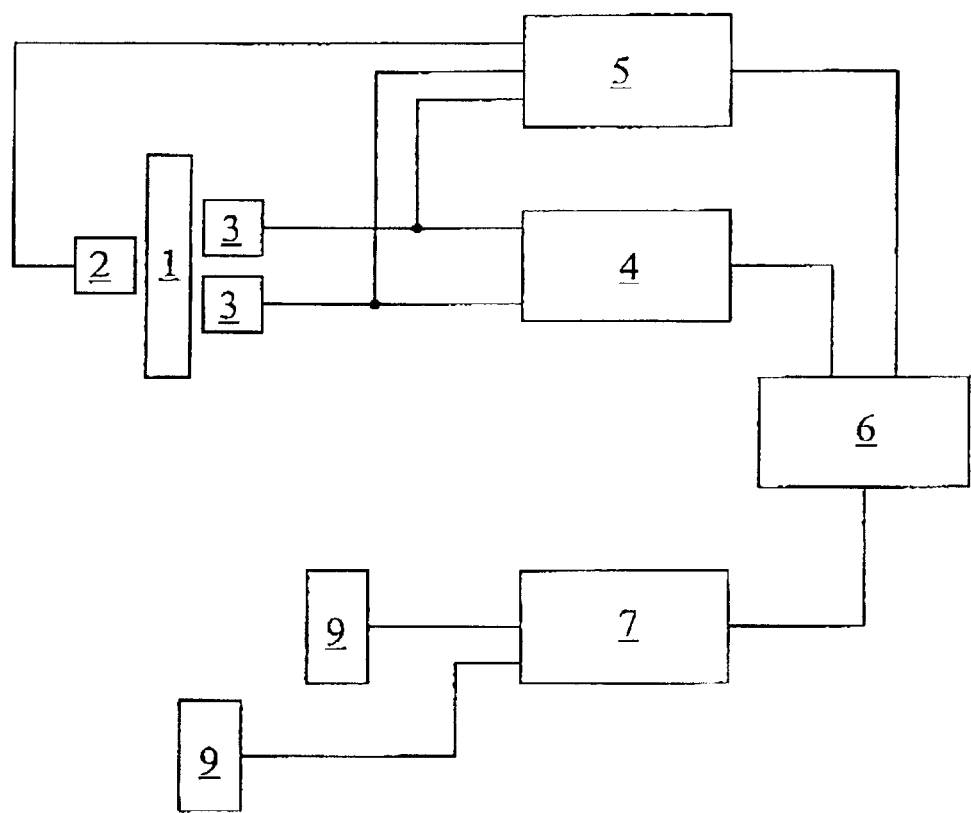
FIG. 2 is a schematic illustration of a mass flowmeter according to a second preferred embodiment of the invention.

FIG. 2 illustrates a mass flowmeter according to a second preferred embodiment of this invention. The configuration of the mass flowmeter according to FIG. 2 is essentially identical to that of the mass flowmeter of FIG. 1 except that in lieu of a two wire port 8, two bus-type interfaces 9 are provided. Mutually different measuring data are retrieved via the two bus interfaces 9. In the second preferred mass flowmeter design of the invention of FIG. 2, one bus interface 9 outputs data on the mass flow through the Coriolis measuring tube 1 while the other bus interface 9 outputs density data on the medium flowing through the Coriolis measuring tube 1 as measured by the mass flowmeter. The electric power can be fed in through either one of these bus interfaces 9. If the electric power is supplied via both bus interfaces 9, the electric power consumed in the mass flowmeter is controlled on the basis of the total electric power available via both bus interfaces 9. Other than that, the control of the mass flowmeter components by the power control unit 6 is identical to the controlling process described in connection with the first mass flowmeter embodiment shown in FIG. 1

Figure 3:
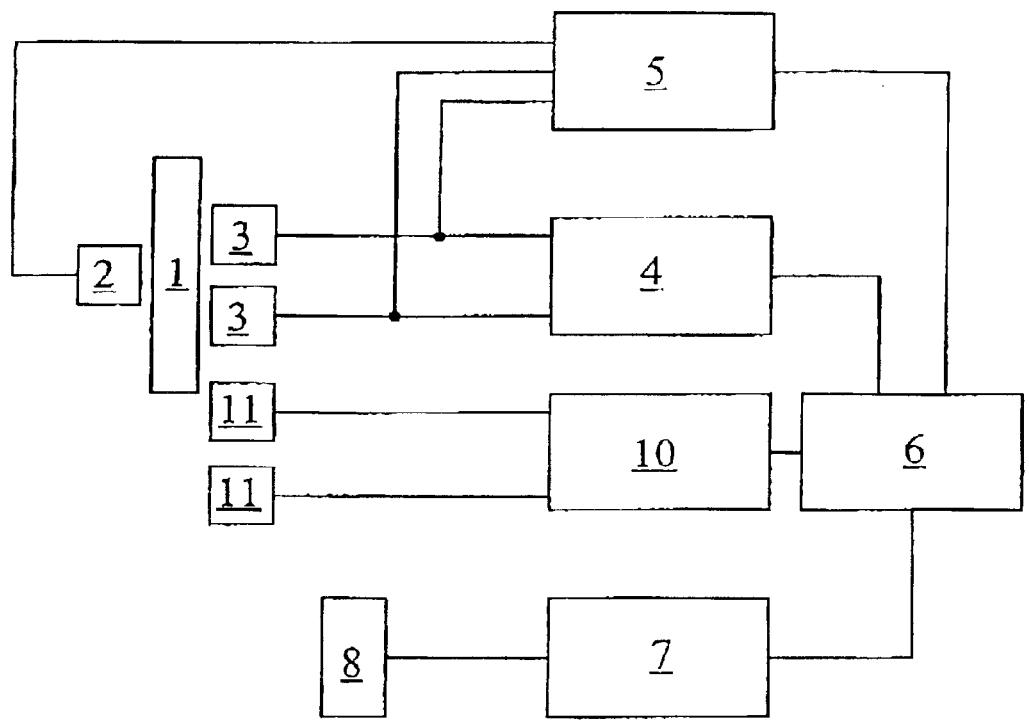
FIG. 3 is a schematic illustration of a mass flowmeter according to a third preferred embodiment of the invention.

Finally, FIG. 3 depicts a mass flowmeter according to a third preferred embodiment of the invention. Complementing the mass flowmeter design of the first preferred embodiment of the invention shown in FIG. 1, this particular mass flowmeter includes provisions whereby, through a microcontroller-type control unit 10, additional purely passive output ports 11 can be addressed. No electric power is supplied via these passive output ports 11. These passive ports 11 merely serve for the output of status information or messages and/or for transferring, for instance, settings entered via a keyboard. In this case as well, the components of the mass flowmeter are controlled by the power control unit 6 in the same way as explained in connection with the mass flowmeter according to the first preferred embodiment of the invention illustrated in FIG. 1.

What is claimed is:

1. A method for operating a mass flowmeter that employs the Coriolis principle and incorporates a Coriolis measuring tube, an oscillator associated with and stimulating said Coriolis measuring tube, and a transducer associated with said Coriolis measuring tube and collecting Coriolis forces and/or oscillations based on Coriolis forces, comprising the following steps:

measuring the available electric power in the mass flow meter;

providing an A/D converter for digitizing the measuring signals emanating from the transducer, and controlling the electric power consumed in the mass flowmeter as a function of the available electric power by controlling the sampling frequency of the A/D converter as a function of the available electric power by using a lower sampling frequency in the event of reduced electric power.

2. The method as in claim 1 wherein, for controlling the electric power consumed in the mass flowmeter, a power control unit is provided which power control unit transitions into an energy-saving sleep mode whenever the available electric power drops below a predefined level.

3. The method as in one of the claims 1 or 2, wherein the input of electric power and the output of the measuring signal take place via at least one two wire interface.

4. The method as in claim 3, wherein the output of the measuring signal is in the form of a current signal of between 4 mA and 20 mA.

5. The method as in one of the claims 1 or 2, wherein for the supply of electric power and the output of measuring data, at least one bus-type interface is used.

6. A mass flowmeter operating by the Coriolis principle and incorporating a Coriolis measuring tube, an oscillator associated with and stimulating said Coriolis measuring tube, and a transducer associated with said Coriolis measuring tube and collecting Coriolis forces and/or oscillations based on Coriolis forces, wherein, a power measuring device is provided for measuring the available electric power in the mass flowmeter, and for controlling the electric power consumed in the mass flowmeter, a power control unit is provided, which is connected to the power measuring device, wherein an A/D converter is provided for digitizing the measuring signal emanating from the transducer and, by means of the power control unit, the sampling frequency of said A/D converter can be controlled such that in the event of reduced electric power, a lower sampling frequency is used.

7. The mass flowmeter as in claim 6, wherein for the input of electric power and the output of the measuring signal, at least one two face port is provided.

8. The mass flowmeter as in claim 7, wherein the measuring signal can be retrieved as a current signal of between 4 mA and 20 mA.

9. The mass flowmeter as in one of the claim 7 or 8 wherein for the input of electric power and the output of measuring data, at least one bus-type interface is provided.

10. A method for operating a mass flowmeter that employs the Coriolis principle and incorporates a Coriolis measuring tube, an oscillator associated with the stimulating said Coriolis measuring tube, and a transducer associated with said Coriolis measuring tube and collecting Coriolis forces and/or oscillations based on Coriolis forces, comprising the following steps:

measuring the electric power available in the mass flowmeter, and controlling the electric power consumed in the mass flowmeter as a function of the available electric power by controlling the mean value of the oscillatory energy of the Coriolis measuring tube of the basis of the available electric power.

11. The method as in claim 10, wherein the oscillator is activated as a function of the available electric power.

12. The method as in claim 11, wherein the oscillator is activated with its amplitude determined by the available electric power.

13. The method as in claim 12, wherein a reduction in available electric power correspondingly reduces the amplitude generated.

14. The method as in one of the claims 11 to 13, wherein, as a function of the available electric power, the activation of the oscillator takes place with time gaps.

15. The method as in claim 14, wherein the oscillator is activated at time intervals.

16. The method as in one of the claims 11 to 13, wherein, for controlling the electric power consumed in the mass flowmeter, a power control unit is provided which power control unit transitions into an energy-saving sleep mode whenever the available electric power drops below a predefined level.

17. The method as in one of the claims 11 to 13, wherein the input of electric power and the output of the measuring signal take place via at least one two wire interface face.

18. The method as in claim 17 wherein the output of the measuring signal is in the form of a current signal of between 4 mA and 20 mA.

19. The method as in one of the claims 11 to 13 wherein for the supply of electric power and the output of measuring data, at least one bus-type interface is used.

* * * * *